United States Patent [19]
Yamada

[11] Patent Number: 4,831,460
[45] Date of Patent: May 16, 1989

[54] IMAGE READING APPARATUS

[75] Inventor: Yoshikado Yamada, Kashihara, Japan

[73] Assignee: Sharp Kabushiki Kaisha, Osaka, Japan

[21] Appl. No.: 183,984

[22] Filed: Apr. 20, 1988

[30] Foreign Application Priority Data

Apr. 21, 1987 [JP] Japan ................................ 62-98323

[51] Int. Cl.⁴ ................................................ H04N 1/04

[52] U.S. Cl. ................................ 358/294; 358/213.31; 358/293

[58] Field of Search .................... 358/294, 293, 213.31, 358/75, 80

[56] References Cited

U.S. PATENT DOCUMENTS

| | | | |
|---|---|---|---|
| 4,250,526 | 2/1981 | Fuwa | 358/293 |
| 4,331,914 | 5/1982 | Huber | 323/324 |
| 4,463,284 | 7/1984 | Tamura et al. | 315/158 |
| 4,624,547 | 11/1986 | Endo et al. | 355/14 E |
| 4,636,081 | 1/1987 | Saitoh | 358/75 |
| 4,639,608 | 1/1987 | Kuroda | 358/294 |
| 4,658,302 | 4/1987 | Sakamoto | 358/213.31 |
| 4,737,857 | 4/1988 | Rucci | 358/294 |

*Primary Examiner*—Howard W. Britton
*Attorney, Agent, or Firm*—Birch, Stewart, Kolasch & Birch

[57] ABSTRACT

An image reading apparatus having a solid state pick-up device for receiving light reflected from an image that is irradiated by a light source supplied with AC power. The image reading apparatus includes a zero cross pulse generating circuit that is supplied by an AC supply voltage and a received light amount detection starting time setting device which sets the delay time for a specified period of time from the generation of a pulse by the zero cross pulse generating circuit relating to the time for the solid state pick-up device to start detecting the quantity of light received. The image reading apparatus synchronizes this timing to ensure that an image is irradiated with a constant quantity of light.

4 Claims, 5 Drawing Sheets

FIG. 4 (A)
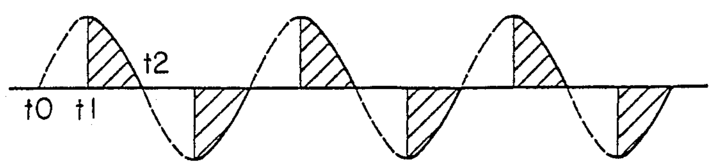
FIG. 4 (B)
t0 t2
FIG. 4 (C)
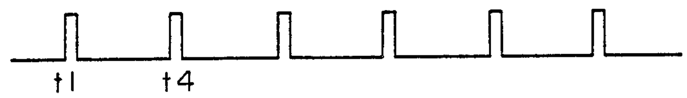
FIG. 4 (D)
t3 t8
FIG. 4 (E)
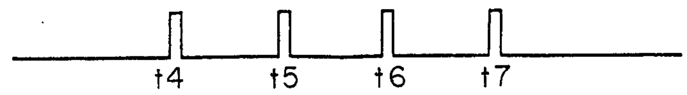

IMAGE READING APPARATUS

BACKGROUND OF THE INVENTION

The embodiments of the present invention relate to an image reading apparatus such as a document size reading apparatus and an image density detecting apparatus for a copying machine in which a solid state pick-up device receives light reflected from the image on a document.

A CCD line sensor is most widely used as the solid state pick-up device of an image reading apparatus. The light source of the image reading apparatus is normally a halogen lamp. For the CCD line sensor to read an image, it is necessary to control the quantity of light emitted from the light source according to the density of the image. For this reason, the conventional image reading apparatus is not capable of accurately reading a manuscript image.

SUMMARY OF THE INVENTION

The object of the embodiments of the present invention is to provide an improved image reading apparatus which synchronizes the timing for a solid state pick-up device to detect the quantity of light received with the zero cross timing an AC power supply. The timing synchronization ensures that an image is irradiated with a constant quantity of light from a light source for all periods between adjacent detection start timings so that the image may be accurately read.

Briefly described, in accordance with the embodiments of the present invention, an image reading apparatus having a solid state pick-up device receives light reflected from an image that is irradiated by a light source supplied with AC power. The image reading apparatus includes a zero cross pulse generating circuit to which an AC supply voltage is applied and a reflected light amount detection starting time setting unit which sets a delay time. The delay time is set for a specified period of time after the generation of a pulse by the zero cross pulse generating circuit as the time for the solid state pick-up device to start detecting the quantity of light received.

BRIEF DESCRIPTION OF THE DRAWINGS

The embodiments of the present invention will become more fully understood from the detailed description given hereinbelow and the accompanying drawings which are given by way of illustration only, and thus are not limitative of the present invention and wherein:

FIG. 4 is a timing chart of the image reading apparatus of the present invention.

DESCRIPTION OF THE PREFERRED EMBODIMENT

Figure 2:
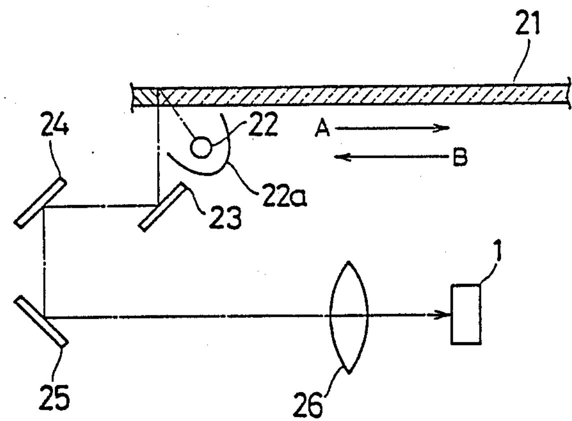
FIG. 2 is a schematic construction drawing of the essential part of the image reading apparatus of the present invention.

FIG. 2 is a schematic construction drawing of the essential part of the image reading apparatus of an embodiment of the present invention.

A document rest 21 is made of hard transparent glass. A halogen lamp 22 is provided as a light source and is disposed under the document rest 21. Light emitted from the halogen lamp 22 is distributed by a reflector **22*a* to the image-carrying surface of a document placed on the document rest 21. The halogen lamp 22 scans the image on the document by oscillating in the directions "A" and "B" with respect to the document rest 21. Light emitted from the halogen lamp 22 is reflected by the image-carrying surface of the document and passes through mirrors 23, 24 and 25 and a lens 26. The light enters a CCD line sensor 1** as indicated by a chain line in FIG. 2.

Figure 1:
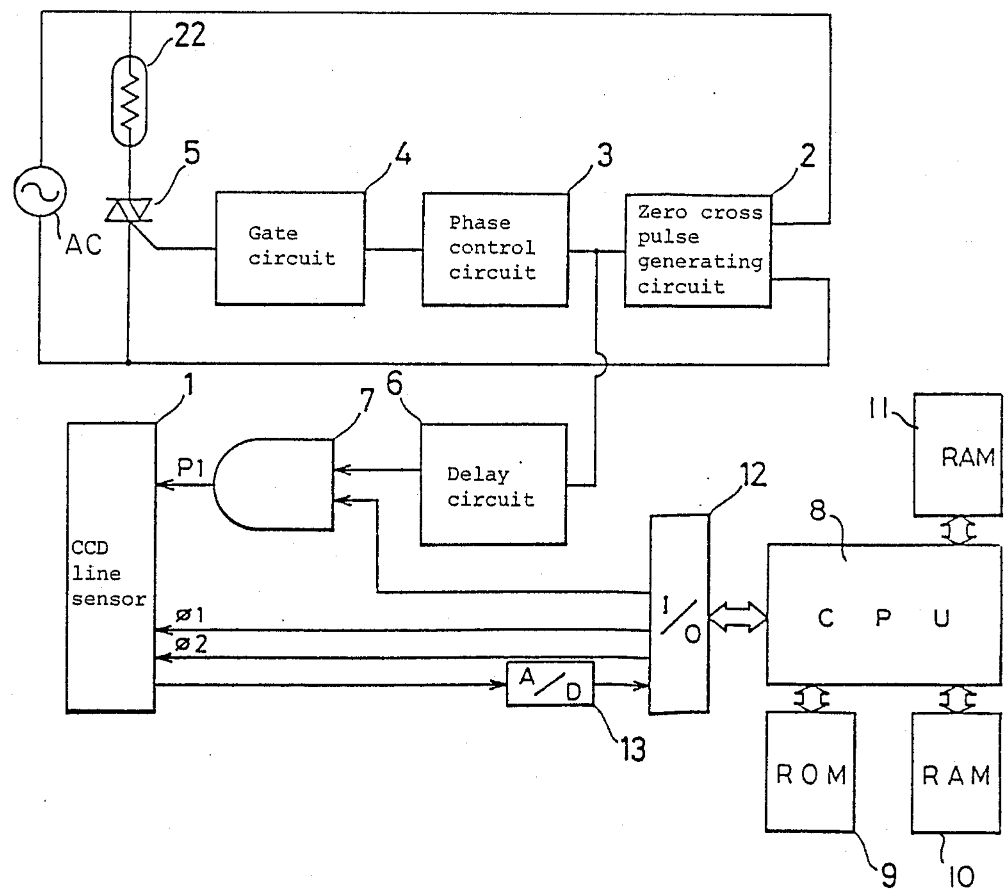
FIG. 1 is a block diagram of the image reading apparatus of an embodiment of the present invention.

FIG. 1 is a block diagram of the controller for the image reading apparatus of an embodiment of the present invention.

The halogen lamp 22 is connected with an AC power source and is phase-controlled by a triac 5. A gate pulse is applied by a gate circuit 4 to the triac 5. The gate circuit 4 receives gate pulse application timing data from a phase control circuit 3. A zero cross pulse generating circuit 2 detects zero cross timing of the AC power supply with the halogen lamp 22. A zero cross pulse is received from the zero cross pulse generating circuit 2, and the phase control circuit 3 outputs the gate pulse application timing data to the gate circuit 4 based on the zero cross pulse. The above construction for phase control by the use of a zero cross pulse generating circuit is typical.

The zero cross pulse generating circuit 2 also supplies a zero cross pulse to a delay circuit 6. The delay circuit 6 outputs zero cross delay signals to an AND gate 7 with timings that are lagged for a specified period of time from the zero cross timing. A CPU 8, which constitutes a controller, outputs shift pulse control signals to the AND gate 7. When the zero cross delay signal from the delay circuit 7 and the shift pulse control signal from the CPU 8 are at a HIGH logical level, the AND gate 7 supplies a shift pulse "P" to the CCD line sensor 1. When the shift pulse "PL" is received, the CCD line sensor 1 opens transfer gates 34 and 35 which sends photoelectrically converted electric charges by a photo diode 31 to CCD shift registers 32 and 33. The CPU 8 supplies clock pulses $\phi$1 and $\phi$2 to the CCD line sensor 1 at specified intervals. Using the input clock pulses $\phi$1 and $\phi$2 as driving pulses, the CCD line sensor 1 sequentially reads the content of the CCD shift registers 32 and 33 sequentially. The read data is input through an A/D converter 13 to the CPU 8 as image data and is stored in a RAM 11.

Figure 3:
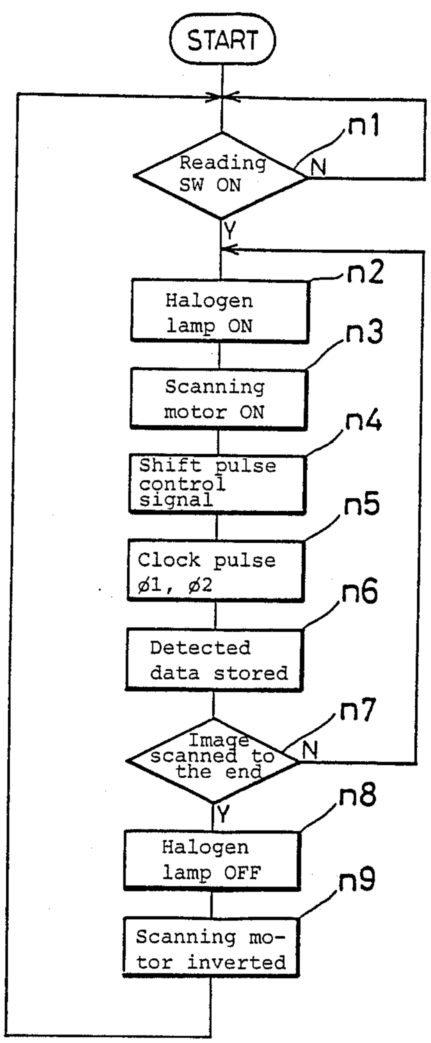
FIG. 3 is a flow chart for explaining the processing sequence by the controller of the image reading apparatus of the present invention.
Figure 5:
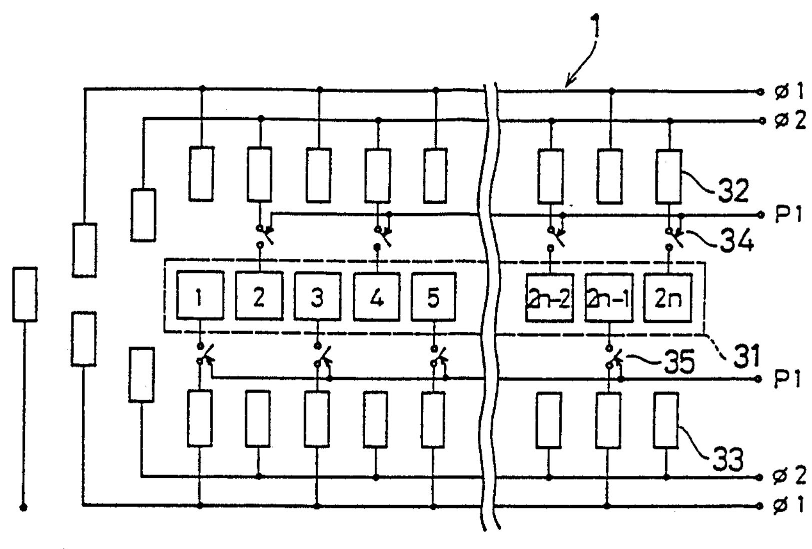
FIG. 5 shows a model of a solid state pick-up device for use in the image reading apparatus of the present invention.

FIG. 3 is a flow chart which shows the processing sequence for the controller of the image reading apparatus.

When a document is set on the document rest 21, a reading switch (not shown) is ON (n1). Then, timing data is supplied to the phase control circuit 3 so that the halogen lamp 22 is turned ON (n2). The document rest 21 is moved horizontally (n3), and the halogen lamp 22 is allowed to scan the image on the document. Simultaneously, the CPU 8 outputs a shift pulse control signal to the AND gate 7 (n4) and clock pulses $\phi$1 and $\phi$2 to the CCD line sensor 1 (n5). Data detected by the CCD line sensor 1 is read and stored in the RAM 11 (n6). The processes in steps n2 through n6 are repeated until the entire document has been scanned by the halogen lamp 22 (n7). After the entire document has been scanned, the power supply for the halogen lamp 22 is shut off (n8) and the rotation of the scanning motor is inverted so that the document rest 21 returns to the initial position.

FIGS. 4(A) through 4(E) are timing charts of the image reading apparatus for the embodiments of the present invention.

When supplied with AC power of sine wave form shown in FIG. 4(A) is supplied, the zero cross pulse generating circuit 2 generates pulses at the zero cross timings $t_0$, $t_2$, etc. of the sine wave form for the AC power, as shown in FIG. 4(B). A zero cross pulse is applied to the delay circuit 6, which is outputted to the AND gate 7 so that a zero cross delay signal lagged by $(t_1-t_0)$ from the zero cross pulse is provided as shown in FIG. 4(C). Therefore, the zero cross delay signals are output from the delay circuit 6 at the same intervals as the zero cross pulses supplied from the zero cross pulse generating circuit 2. Meanwhile, the CPU 8 outputs a shift pulse that are control signal to the AND gate 7 for the time period from $t_3$ to $t_8$. Everytime the AND gate 7 receives a zero cross delay signal from the delay circuit 6 during this time period, the AND gate 7 outputs a shift pulse "Pl" to the CCD line sensor 1.

Thus, the intervals of the shift pulse 1 supplied to the CCD line sensor 1 coincide with the intervals of the zero cross pulse generated by the zero cross pulse generating circuit 2. Since the zero cross pulse generating circuit 2 detects the zero cross timing of the AC power supply for the halogen lamp 22, the ripple intervals contained in the light emitted from the halogen lamp 22 also conform to the ripple intervals of the zero cross pulses output from the zero cross pulse generating circuit 2. Therefore, the intervals of the shift pulses supplied to the CCD line sensor 1 have the same intervals as the ripples of the light from the halogen lamp 22. Accordingly, a constant quantity of light is emitted from the halogen lamp 22 for all intervals between any adjacent shift pulses "Pl". In considering that each shift pulse "Pl" occurs at the same time as the CCD line sensor 1 begins detection for the quantity of light received, the quantity of light emitted from the halogen lamp 22 is constant for all intervals between any adjacent detection start timings.

As shown in FIGS. 4(A) and 4(C), when the timing of a zero cross delay signal output from the delay circuit 6 conforms to the timing of a gate pulse supplied to the gate circuit 4 from the phase control circuit 3, the CCD line sensor 1 can start detecting the quantity of received light when the quantity of light emitted from the halogen lamp 22 is almost at a maximum value.

According to the embodiments of the present invention, the zero cross timing of the AC power supplied to the light source is detected by the zero cross pulse generating circuit, and a pulse is generated when the AC power crosses the zero line. The reflected light amount detection starting time setting unit sets the time delay for a specified period of time after the generation of this pulse as the timing for the CCD line sensor starts detecting the quantity of light received, so that the solid state pick-up device starts detecting the quantity of received light when the timing is set. Therefore, the detection of the quantity of received light by the solid state pick-up device is synchronous with the zero cross timing of the AC power supply. So, if the supply voltage applied to the light source is maintained constant for all intervals between any adjacent zero cross pulses, the quantity of light projected on the document image should be constant for all intervals between any adjacent received light amount detection start timings.

According to embodiments of the present invention, as mentioned above, since the solid state pick-up device starts detecting the quantity of received light at a specified period of time after the zero cross timing of the AC power supplied to the light source, the intervals for the received light amount detection start timings coincide with the intervals of the zero cross timings of the AC power supply. Consequently, the ripple intervals contained in the light emitted from the light source conform to the timings for starting the detection of the quantity of light received. As a result, the image reading apparatus of the embodiments of the present invention is capable of reading an image accurately by having a constant quantity of light irradiated from the light source onto the image.

While only certain embodiments of the present invention have been described, it will be apparent to those skilled in the art that various changes and modifications may be made therein without departing from the spirit and scope of the present invention as claimed.

What is claimed is:

1. An image reading apparatus having a solid state pick-up device for receiving light reflected from an image being irradiated by a light source supplied with AC power, comprising:

zero cross pulse generating means which is supplied with an AC supply voltage; and received light amount detection starting time setting means for setting a delay time that is delayed by a predetermined time period from zero cross pulses generated by said zero cross pulse generating means, said delay time initiates said solid state pick-up device to start detecting the quantity of light received.

2. The image reading apparatus of claim 1, wherein the intervals of shift pulses supplied to said solid state pick-up device conform to said zero cross pulses generated by said zero cross pulse generating means.

3. The image reading apparatus of claim 1, wherein said zero cross pulse generating means detects zero cross timings of the AC power, and the ripple intervals contained in light emitted from said light source coincide with the ripple intervals of said zero cross pulses.

4. The image reading apparatus of claim 1, wherein said received light amount detection starting time setting means comprises delay circuit means.

* * * * *